(12) United States Patent
Bates et al.

(10) Patent No.: US 6,406,621 B1
(45) Date of Patent: Jun. 18, 2002

(54) SKIMMER ASSEMBLY (76) Inventors: Gary G. Bates; Rosemary A. Bates; Scott B. Bates, all of New Boston, MI (US)

( * ) Notice: Subject to any disclaimer, the term of this patent is extended or adjusted under 35 U.S.C. 154(b) by 0 days.

(21) Appl. No.: 09/929,884

(22) Filed: Aug. 14, 2001

Related U.S. Application Data (63) Continuation-in-part of application No. 09/523,840, filed on Mar. 13, 2000, now Pat. No. 6,274,047.

(51) Int. Cl.[7] .......................... B01D 35/05; E02B 15/00
(52) U.S. Cl. ................. 210/170; 210/242.1; 210/416.1; 15/1.7
(58) Field of Search ................................ 210/169, 170, 210/232, 238, 242.1, 416.1, 416.2; 4/490; 15/1.7

(56) References Cited

U.S. PATENT DOCUMENTS

| | | | | |
|---|---|---|---|---|
| 2,579,304 A | * | 12/1951 | Crawford | |
| 3,032,044 A | * | 5/1962 | Pansini | |
| 3,303,932 A | * | 2/1967 | Hirs et al. | |
| 3,348,686 A | * | 10/1967 | Spitzer | |
| 3,402,817 A | * | 9/1968 | Dovel | |
| 3,642,617 A | * | 2/1972 | Brink et al. | |
| 3,758,276 A | * | 9/1973 | Bond et al. | |
| 3,970,556 A | * | 7/1976 | Gore | |
| 4,126,925 A | * | 11/1978 | Jacuzzi | |
| 4,212,740 A | * | 7/1980 | Greene | |
| 4,325,150 A | * | 4/1982 | Buddy | |
| 4,879,028 A | * | 11/1989 | Gibson | |
| 5,052,855 A | * | 10/1991 | Chapman et al. | |
| 5,985,156 A | * | 11/1999 | Henkin et al. | |
| 6,274,047 B1 | * | 8/2001 | Bates et al. | |

* cited by examiner

Primary Examiner—Richard L. Chiesa
Assistant Examiner—Fred Prince (57) ABSTRACT

A skimmer assembly is provided having an inlet member, a transfer conduit and a floatation means. The skimmer assembly acts to draw a fluid from a surface of a body of the fluid. The floatation means provides continual buoyancy to at least the inlet member of the skimmer assembly. Various configurations of inlet member are explained. Typically, the inlet member, trailing the transfer conduit, will be free to float relative to the surface of the body of fluid. Various placements of pumps and filter members are disclosed. A churning of the fluid entering the skimmer assembly provides for foam fractionation wherein solids within the fluid may be separated from the fluid for subsequent removal prior to return of the fluid to the body of fluid. Various methods are disclosed to remove air bubbles containing the trapped solids from the fluid stream.

20 Claims, 8 Drawing Sheets

SKIMMER ASSEMBLY

CROSS-REFERENCE

This application is a continuation-in-part of Ser. No. 09/523,840 filed Mar. 13, 2000, entitled "Skimmer Assembly", now U.S. Pat. No. 6,274,047. The original application is incorporated herein by this reference.

BACKGROUND

1. Field of the Invention

Generally, the invention relates to skimmer devices. More specifically, the invention relates to such skimmer devices which draw a fluid from a surface of a body of the fluid.

2. Description of the Prior Art

Various bodies of fluid exist which require skimming for several useful reasons. These reasons include mere circulation of the fluid, removal of a lighter fluid floating on a heavier base fluid, filtering removal of various visible debris from the fluid and removal of tiny particle solids from the fluid utilizing foam fractionation.

These bodies of fluid include many primarily containing water as well as these containing other compositions. These bodies of fluid may be natural, as exampled by rivers, lakes and oceans, or man made, as exampled by pools, spas, tanks and ponds. When the body of fluid is man made the purpose may be recreational, as exampled by the pools or spas, may be ornamental, as exampled by ponds, or may be for a purification of the fluid, as exampled by an industrial treatment or water purification or during a sewage treatment.

When visible debris enters a body of fluid the debris may enter the body of fluid by landing upon the surface, remaining there for a period of time, and eventually sinking to reside upon a bottom of the body of fluid. Examples of such debris include vegetation, such a leaves, twigs and grass cuttings, dirt and sand, or ash and soot. The most convenient method of removing such debris which lands on the surface of the body of fluid involves removal while the debris remains upon the surface of the body of fluid.

The art is rich with devices, and associated methods, designed to remove floating debris from the surface of a body of fluid. Typically these devices include a stationary housing mounted at an edge of the body of fluid into which fluid from the body of fluid may readily flow. Several of these devices include methods to provide for a self adjustment of the housing, or at least a portion thereof, to compensate for an elevational level, within a limited elevational range, of the body of fluid. Several of these devices include floating skimmers which are linked to a fluid suction device wherein the floating skimmer may drift about the surface of the body of fluid.

Particle solids, as exampled by proteins, may be widely dispersed within the fluid. Foam fractionation is known in the art to trap such solids on, or in, air bubbles for subsequent removal of the air bubbles from the body of fluid.

Debris which enters the fluid may eventually sink and reside on a bottom of the body of fluid. The art is rich with devices, and associated methods, designed to remove debris from the bottom of the body of fluid. These devices may be stationarily positioned relative to the bottom. Alternatively, these devices may move about the bottom. When the device is designed to move about the bottom the device may be self propelled or the device may require manual manipulation by an operator.

Various deficiencies exist with each of the methods outlined above. As can be seen various attempts have been made to circulate and/or filter fluid. These attempts have been less efficient than desired. As such, it may be appreciated that there continues to be a need for a skimmer assembly which may free float slightly below the surface of a body of a fluid while being supported by a buoyancy incorporated about the skimmer assembly during a skimming procedure. The present invention substantially fulfills these needs.

SUMMARY

In view of the foregoing disadvantages inherent in the known types of assemblies, your applicants have devised a method of skimming from the surface of a body of fluid wherein an inlet member of the skimmer assembly free floats below the surface of the fluid during the skimming procedure. The skimmer assembly has an inlet member, a transfer conduit and floatation means. The skimmer assembly attaches to a fluid suction device which acts to draw fluid from a surface of a body of the fluid through the inlet member and through the transfer conduit. The inlet member, with the transfer conduit attached thereto, floats relative to the surface of the body of fluid supported by a buoyancy of the floatation means during the drawing of fluid from the surface of the fluid. The inlet member has a wall member radially disposed about a passageway through the inlet member with an inlet opening at one end of the passageway and an outlet opening at the opposing end of the passageway. The transfer conduit has an inlet member attachment end and a fluid suction device attachment end. The inlet member attachment end of the transfer conduit is attached to the inlet member to close the outlet opening of the inlet member. The fluid suction device attachment end of the transfer conduit attaches for communication with the fluid suction device. The floatation means provides for the inlet member to float in the body of fluid. During the skimming procedure the inlet opening of the inlet member free floats just beneath the surface of the body of fluid during the drawing of the fluid from the surface of the body of fluid using, at least in part, the buoyancy of the floatation means.

Our invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a skimmer assembly which draws fluid from a surface of a body of the fluid.

Other objects include;

a) to provide for a skimmer assembly having an inlet member which free floats relative to the surface of the fluid utilizing a continual buoyancy positioned relative to the inlet member.

b) to provide for the continual buoyancy to be attached to the inlet member.
c) to provide for the continual buoyancy to be attached to the transfer conduit.
d) to provide for the continual buoyancy to be incorporated into the construction of the inlet member.
e) to provide for an air cavity to be formed between the inlet member and a transfer conduit to provide for secondary buoyancy to the continual buoyancy wherein the air cavity is open to an interior of the transfer conduit.
f) to provide for an open based air cavity to be positioned radially about an inlet opening of the inlet member to provide for secondary buoyancy to the continual buoyancy.
g) to provide for the skimmer assembly to also remove floating debris from the surface of the body of fluid.
h) to provide for filtration of the debris from the fluid during transfer through the skimmer assembly.
i) to provide for the skimmer assembly to mix air with the fluid wherein foam fractionation occurs to trap solids within the fluid on, or in, air bubbles.
j) to provide for removal of air bubbles containing solids utilizing a surface suction method from a collection housing.
k) to provide for removal of air bubbles containing solids utilizing a method of directing an air flow above a surface of the fluid within a collection housing having an overflow lip.
l) to provide for an intermediate floating tank positioned wherein a transfer conduit extends therefrom to the inlet member and a transfer conduit extends therefrom for subsequent connection to a fluid suction device and wherein the intermediate floating tank is positioned to free float within the body of fluid.
m) to provide for ridges, as exampled by threads, to be positioned within an interior of the inlet member to assist in the foam fractionation during drawing of the fluid into the skimmer assembly.
n) to provide for the skimmer assembly to be employed in an outdoor pond as known for ornamental decoration in a yard.
o) to provide for the skimmer assembly to be employed in various fluid treatment procedures as exampled by sewage treatment and other environmental treatments.
p) to provide for adaptation of the skimmer assembly wherein the assembly may be utilized for suction for debris from a bottom of the body of fluid during manipulation of a guidance handle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION

Many different systems having features of the present invention are possible. The following description describes the preferred embodiments of select features of those systems and various combinations thereof. These features may be deployed in various combinations to arrive at various desired working configurations of systems. Reference is hereafter made to the drawings where like reference numerals refer to like parts throughout the various views.

The present invention may perform skimming of, or associated treatments on, fluids of various compositions. The fluid being skimmed, or otherwise treated, may be contained in various bodies of fluid either natural or man made. Examples of natural bodies of fluid include rivers, lakes and oceans. Examples of man made bodies of fluid include tanks, ponds or pools. As used herein the term tank refers to an above ground container for a body of fluid, where the fluid is of any type, and where the tank is primarily intended for containment of the fluid during a treatment of the fluid. As used herein the term pond refers to an in ground container, with or without a man made liner or wall member, for containment of a body of fluid, where the fluid is of any type, and where the pond is either intended for an ornamental purposes or for mere containment of the fluid during a treatment of the fluid. As used herein the term pool refers to a container, either in ground or above ground, for containment of a body of water and where the pool is primarily intended for recreational use by humans where the humans enter the water, and includes conventional swimming pools as well as spas.

Figure 3:
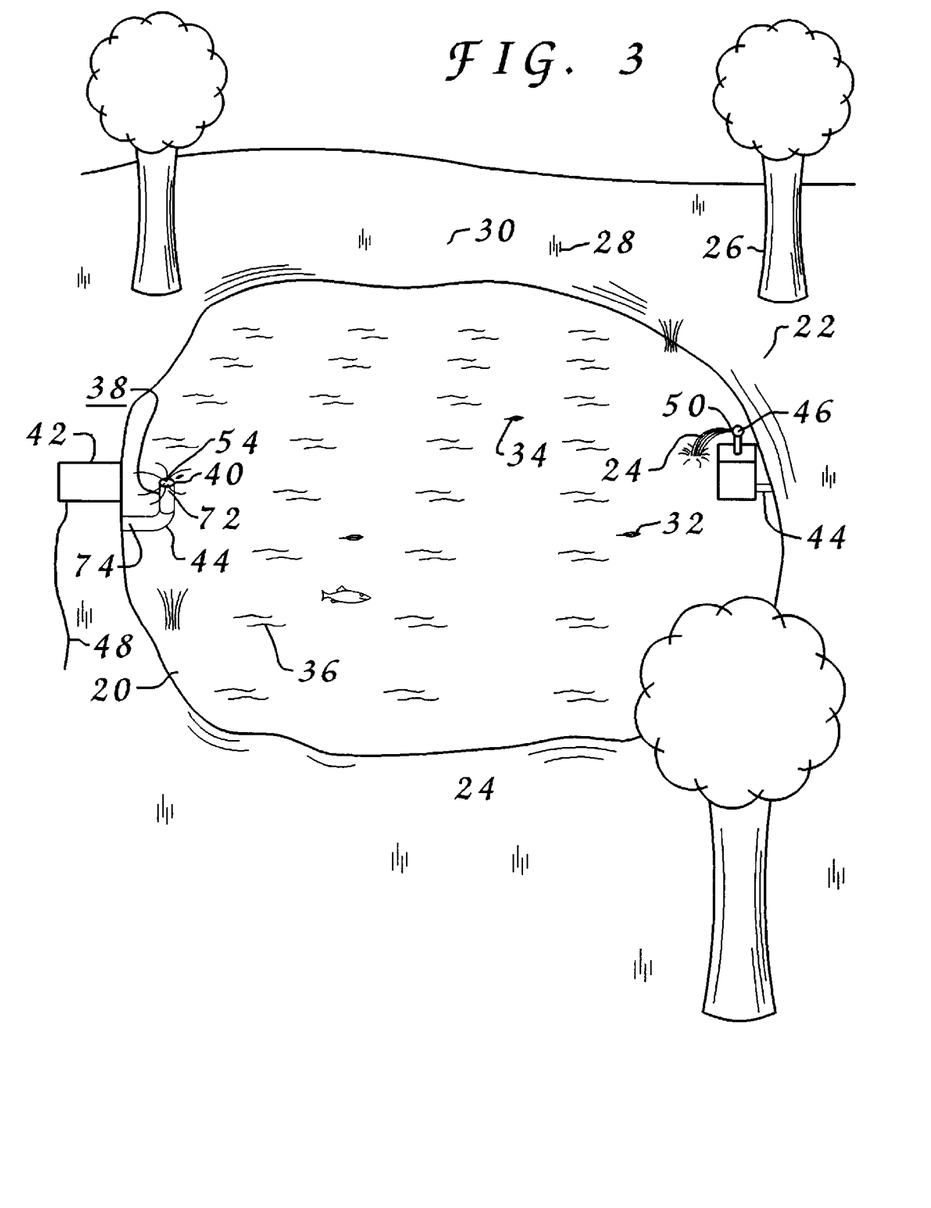
FIG. 3 is a perspective view of the skimmer assembly.

FIG. 3 depicts a body of fluid 20 in the form of a pond 22. Pond 22 is representative of any body of fluid and examples an in ground containment of a fluid 24 as conventionally known for ornamental use to beautify surroundings to enhance aesthetic appeal. In this example pond 22 is positioned outside and is exposed to the surrounding environmental factors, such as trees 26, grass 28 and soil 30, all of which may be introduced into pond 22 in the form of a debris 32, as exampled by leaves 34. Body of fluid 20 has a surface 36 upon which debris 32 may reside, at least for a period of time, following introduction into body of fluid 20.

Many other contaminates may be introduced into the body of fluid including those deliberately introduced therein as well as those contained in rain or the air or on objects placed in the body of fluid. Alternatively, the fluid may already contain the contaminate when placed in, or otherwise moved to, the body of fluid. These contaminates may be of a size which may be seen by an observer without magnification or they may be particle material which individually are invisible to the observer without magnification.

There exist two general methods of contaminate removal which are applicable to the present invention. The first of these methods involves filtration removal of contaminates. The second of these methods involves foam fractionation removal of contaminates. Each of these methods may be practiced utilizing skimmer assemblies having features of the present invention.

Skimmer assemblies having features of the present invention will have floatation means which provide for a continual buoyancy of the inlet opening of the inlet member of the skimmer assembly. This continual buoyancy will involve placement of a permanent buoyant member in close proximity to the inlet opening of the inlet member. This may be accomplished in various ways. In a first example the inlet member, or portions thereof, may be constructed to have an inherent buoyancy. This may be accomplished by selection of the construction material, such as of a Styrofoam type material, or in the configuration of the inlet member, such as a hollow unit. In another example a separate component may be attached to either the inlet member or the transfer conduit where the separate component has properties to provide for the desired continual buoyancy. This separate component may derive it's buoyancy from selection of the construction material or from configuration of the separate component.

Typically, the drawing of the fluid from the body of the fluid through the transfer conduit results in the inlet member in any possible alternative embodiment to be drawn under the surface of the fluid where at least the continual buoyancy of the floatation means and the physical action of the drawing of the fluid cooperate to retain the inlet opening at a desired elevational placement relative to the surface of the fluid. In certain embodiments the secondary buoyancy in the form of an air cavity may be utilized to enhance the operation of the skimmer assembly.

Figure 1:
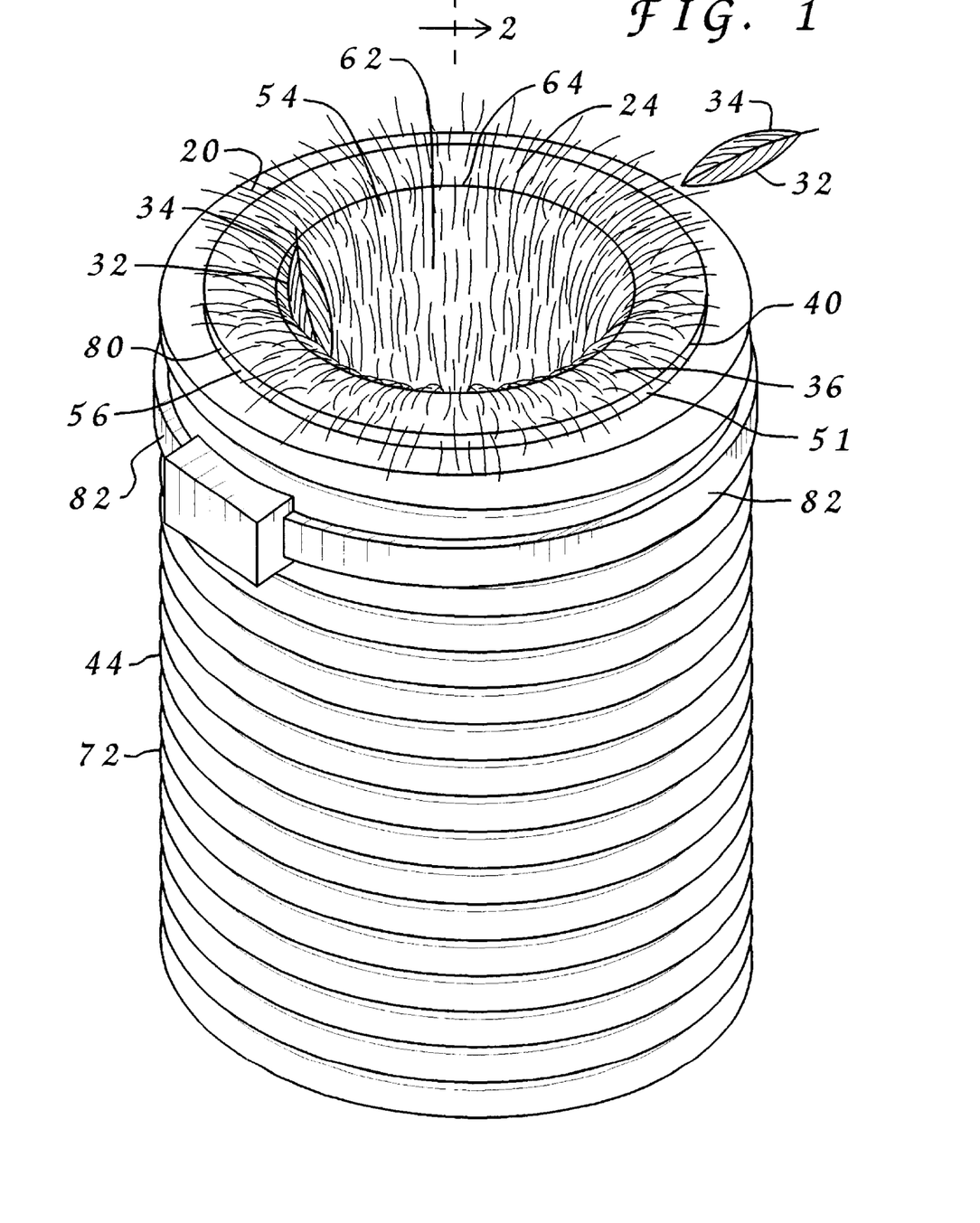
FIG. 1 is a perspective view of an inlet member portion of a skimmer assembly.
Figure 2:
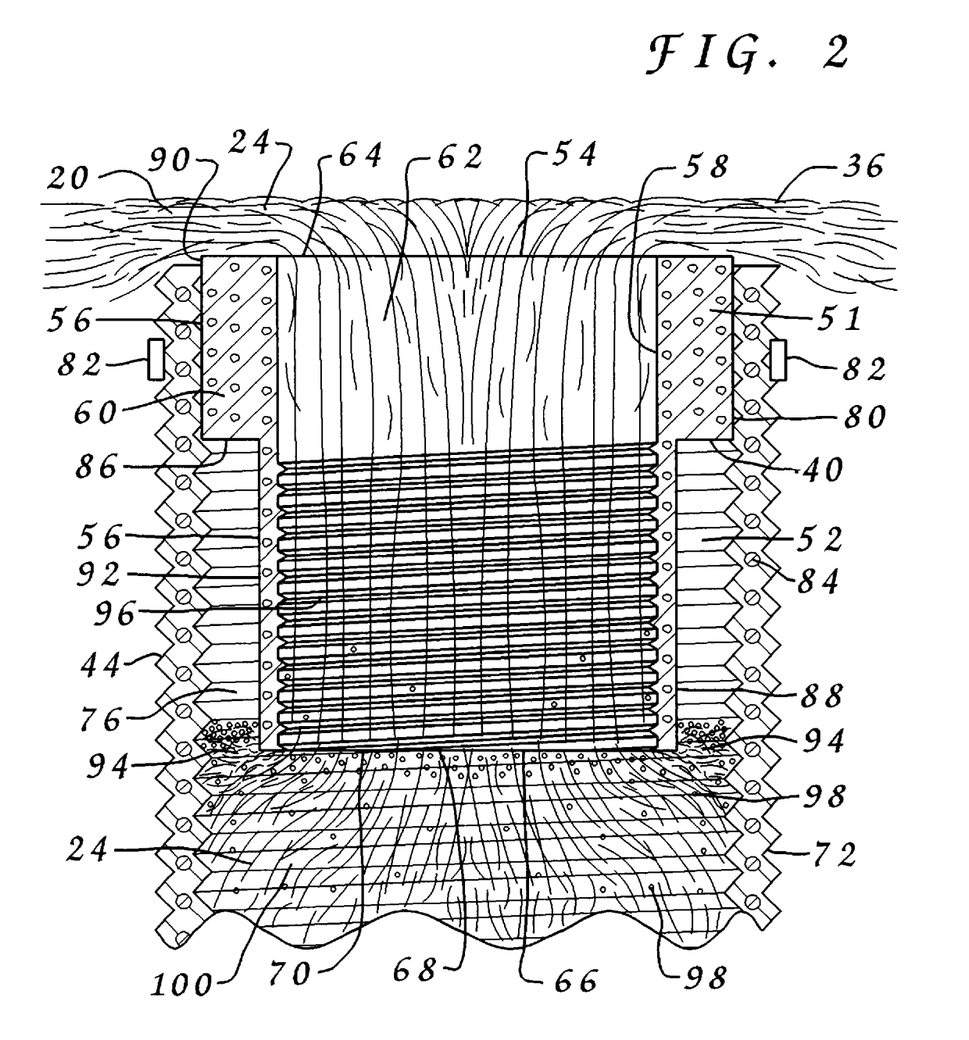
FIG. 2 is a sectional view as taken from the section line '2' shown in FIG. 1.

FIG. 1, FIG. 2 and FIG. 3 depicts a preferred embodiment of the present invention having a skimmer assembly 38, see FIG. 3. Skimmer assembly 38 comprises an inlet member 40, a pump housing 42, a transfer conduit 44 connecting inlet member 40 to pump housing 42, a fountain 46 and transfer conduit 44 connecting fountain 46 to pump housing 42. A pump, not shown in these views, and a filter, also not shown in these views, are contained within pump housing 42. The pump receives power from a power line 48. The pump is capable of fluid transfer means to provide for a drawing of fluid 24 into inlet member 40, associated conveyance of fluid 24 through transfer conduit 44 and expulsion of fluid 24 through a discharge outlet 50 at fountain 46.

Inlet member 40 free floats adjacent, and slightly below, surface 36 of fluid 24 during usage of skimmer assembly 38 during a skimming procedure where a surface skimming is performed. Floatation means, in the form of construction of inlet member 40 from a material 51 having physical properties which provide for a continual buoyancy provides for the desired floating of inlet member 40 relative to surface 36 during occasions while the skimming procedure is not occurring. Secondary buoyancy is provided in this embodiment in the form of an air cavity 52, see FIG. 2, filled with air, which provides for secondary buoyancy for placement of an inlet opening 54 of inlet member 40 relative to surface 36 during occasions while the skimming procedure is occurring.

Referring now more specifically to FIG. 2, inlet member 40 has an exterior 56 and an interior 58 separated by a wall 60. Wall 60 is radially disposed about a passageway 62 which extends through inlet member 40. Wall 60 has an upper terminal edge 64 and a lower terminal edge 66. Upper terminal edge 64 of wall 60 defines inlet opening 54 which allows passage of fluid 24 into passageway 62. Lower terminal edge 66 of wall 60 defines an outlet opening 68 which allows passage of fluid 24 out of passageway 62. In this embodiment, outlet opening 68 defines a base 70 of inlet member 40.

The art is rich with conduit adaptable for use during a conveyance of a fluid. Many of these conduits may be utilized as the transfer conduit of the present invention. In many embodiments of the present invention, though not in all embodiments, at least a portion of the transfer conduit will be flexible. When the transfer conduit is flexible this flexibility may allow for a flexing of the transfer conduit, an extension and retraction of the transfer conduit or both.

Transfer conduit 44, positioned to connect inlet member 40 to pump housing 42 has an inlet member attachment end 72 and a fluid suction device attachment end 74, see FIG. 3. Transfer conduit 44 has an inside surface 76 which attaches to an upper portion 80 of exterior 56 of inlet member 40 to seal inlet member attachment end 72 of transfer conduit 44 except for passageway 62 of inlet member 40. An attachment strap 82 is used to provide a sealing pressure between transfer conduit 44 and inlet member 40. Many other sealing methods, as conventionally known in the art, may be employed to provide the desired bonding between transfer conduit 44 and inlet member 40. Transfer conduit 44, in any specific placement within skimmer assembly 38, provides for a containment of fluid 24 during conveyance therethrough. It is a strong desire to prevent collapse of transfer conduit 44 during operation of skimmer assembly 38. Integrity strengthening means, as conventionally known in the art, may be employed to ensure that such collapse does not readily occur. Metallic wire 84 is one example of such integrity strengthening means which may be employed. Metallic wire 84 performs the desired collapse prevention while allowing transfer conduit 44 to retain the desired flexibility.

In many embodiments, including those depicted in FIG. 1 through FIG. 3, it is a requirement that transfer conduit 44 be flexible to allow for a free floating self regulating movement of inlet member 40 relative to surface 36 of pond 22.

A particularly desirable embodiment to provide for the optional secondary buoyancy in the form of an open air cavity is depicted in FIG. 1 and FIG. 2. Exterior 56 of inlet member 40 has upper portion 80, a transition portion 86 and a lower portion 88. Upper portion 80 has a predominate dimensional measurement 90. Lower portion 88 has a predominate dimensional measurement 92. Transition portion 86 separates upper portion 80 from lower portion 88. Predominate dimensional measurement 92 of lower portion 88 is significantly less than predominate dimensional measurement 90 of upper portion 80.

Preferably, upper portion 80 of exterior 56 of inlet member 40 is smooth to allow for a sealing contact with inside surface 76 of transfer conduit 44 which is, in this embodiment, pliant. Alternatively, upper portion 80 may have a configuration, such as threads, which allows ready mating, or other sealing contact, with inside surface 76 of transfer conduit 44.

The sizing difference between predominate dimensional measurement 90 of upper portion 80 and predominate dimensional measurement 92 of lower portion 88 in this example provides for offset means which provides for formation of air cavity 52 between exterior 56 of inlet member 40 at lower portion 88 and transition portion 86 and inside surface 76 of transfer conduit 44 adjacent to lower portion 88 and transition portion 86.

Due to a sealing contact between inside surface 76 of transfer conduit 44 and exterior 56 of upper portion 80 of inlet member 40 air cavity 52 is closed except for an opening 94 radially disposed adjacent and outside of lower terminal edge 66 of inlet member 40. When inlet member 40 is positioned upright during operation adjacent and below surface 36 air positioned within air cavity 52 cannot escape except through radially disposed opening 94. If desired a configuration, such as threads, not shown, may be incorporated on lower portion 88 of exterior 56 of inlet member 40 to enhance trapping of air within air cavity 52.

Fluid 24 is drawn into inlet opening 54 of inlet member 40 by suction created by the pump and cascades down interior 58. When foam fractionation is desired a texture, as exampled by threads 96, may be positioned along at least a portion of interior 58 of inlet member 40. Such a texture acts to enhance a churning of fluid 24 during passage through passageway 62 to ensure incorporation of air bubbles 98, which act to trap particle material, into fluid 24. As disclosed elsewhere herein at least a portion of these air bubbles 98 may be separated from fluid 24 prior to expulsion of fluid 24 by skimmer assembly 38 back into body of fluid 20 to provide for removal of trapped particle material attached to at least the portion of air bubbles 98 from body of fluid 20.

When fluid 24 is drawn into inlet opening 54 of inlet member 40 debris 32 which resides upon surface 36 may be readily drawn into inlet opening 54 if that debris 32 is of a dimensional size and configuration to permit such passage. Due to the smaller dimensional measurement of passageway 62 relative to an interior 100 of transfer conduit 44 most debris 32 which moves past inlet member 40 will readily pass through transfer conduit 44 without becoming entangled therein. This provides for ease of maintenance of skimmer assembly 38 due to the easy access to such debris 32 offered by placement outside of, or within, passageway 62 of inlet member 40. As disclosed elsewhere herein a filter member may be. employed to trap at least a portion of debris 32 transferred through transfer conduit 44 prior to expulsion of fluid 24 by skimmer assembly 38 back into body of fluid 20 to provide for removal of at least the portion of debris 32 from body of fluid 20.

Even in the absence of structures, as exampled by threads 96, to provide for additional churning of fluid 24, a significant quantity of air will be introduced into transfer conduit 44 and air bubbles 98 will form during operation of skimmer assembly 38. Some of these air bubbles 98, and particularly larger more buoyant ones, will eventually be positioned within transfer conduit 44 in close proximity to base 70 of inlet member 40. Some of these air bubbles 98 will enter air cavity 52 to constantly replenish any air escaping therefrom. This action acts to provide for a self regulating maintenance of air within air cavity 52 to ensure proper floatation of inlet member 40 relative to surface 36 in those embodiments which utilize such an internal air cavity.

During operation of skimmer assembly 38, when inlet member 40 is positioned slightly below surface 36 of body of fluid 20, skimmer assembly 38 will act to skim debris 32 of a visible size from surface 36. Additionally, during such operation skimmer assembly 38 will act to perform foam fractionation to permit a subsequent removal of solids from fluid 24 including those solids of a size not visible using the naked eye.

Numerous configurations are possible for inlet members having features of the present invention. These include one piece constructions as well as multi part constructions.

When an internal air cavity is deployed it is a requirement that structures exist which form an open bottomed air cavity in close proximity to the inlet opening. These structures most likely, but not necessarily, will involve a cooperation between the inside surface of the transfer conduit and a portion of the exterior of the inlet member.

Figure 4:
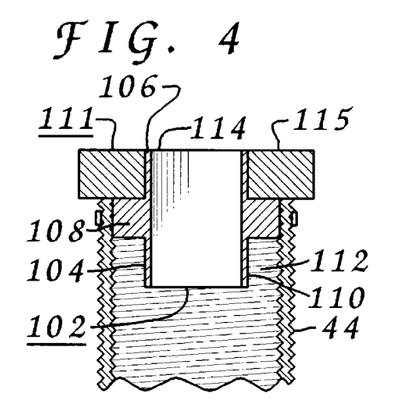
FIG. 4 is a sectional view of another embodiment of an inlet member with a float ring attached thereto.

FIG. 4 depicts an inlet member 102 having an exterior 104 having an upper portion 106, an elevated portion 108 and a lower portion 110. This configuration provides for attachment of a float ring 111 and deployment of an air cavity 112 when inlet member 102 is mounted within transfer conduit 44. Float ring 111 is a floatation member and provides the desired continual buoyancy of the floatation means of the present invention while air cavity 112 provides for a secondary buoyancy at least during performance of a skimming procedure. In this embodiment float ring 111 is of a solid construction from a material having buoyant properties. This configuration of inlet member 102 also provides for a narrow surface about an upper terminal edge 114 which allows for attachment of float ring 111 wherein an upper terminal edge 115 of float ring 111 is level with upper terminal edge 114 of inlet member 102.

Figure 5:
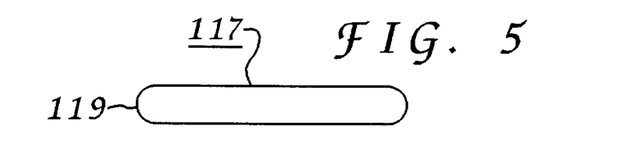
FIG. 5 is a side elevational view of a float ring.

FIG. 5 depicts a float ring 117 which is a floatation member and which provides the desired continual buoyancy of the floatation means of the present invention. In this configuration float ring 117 is formed of a sheet material 119 and has a sealed buoyancy chamber 121 contained therein. Float ring 117 is slightly flexible and may be attached about a suitably sized transfer conduit or inlet member without relying upon any secondary securing means. If desired such secondary securing means may be utilized as exampled by bonding or by use of mechanical coupling.

Figure 6:
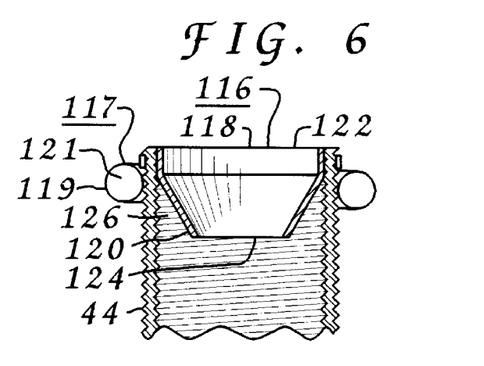
FIG. 6 is a sectional view of another embodiment of an inlet member with the float ring shown in FIG. 5 positioned thereon.

FIG. 6 depict an inlet member 116 having a mounting end 118, which is generally uniformly dimensioned about a central axis, and a conical end 120, which tapers toward the central axis while moving away from mounting end 118. An inlet opening 122 is positioned at mounting end 118 end of inlet member 116 while an outlet opening 124 is positioned at conical end 120. Due to the tapering of conical end 120 an air cavity 126 is formed between inlet member 116 and transfer conduit 44 about conical end 120 when inlet member 116 is mounted within transfer conduit 44. Float ring 117, also see FIG. 5, is depicted positioned around transfer conduit 44 wherein float ring 117 acts as the floatation member of the floatation means.

While the upper terminal edge of the wall of the inlet members depicted in the various views are each planar this is not a limitation of the present invention. In certain deployments it may be a desire to have a configuration which filters, or otherwise prevents, debris from entering into the inlet opening. This is particularly true where the primary purpose of the skimmer assembly is foam fractionation to remove particle material from the fluid or during the removal of a lighter fluid floating upon a heavier base fluid. In such an embodiment it is possible that a portion of the inlet member may extend above the surface of the body of fluid.

The art is rich with pumps capable of pumping a fluid and many of these pumps may be employed with the present invention. These include submersible pumps as well as pumps which operate outside of the fluid. The pump may be positioned adjacent the body of fluid, fixedly positioned within the body of fluid or positioned in a housing which floats in the body of fluid. The pump may be positioned within the body of fluid on, or even beneath, the bottom of the body of fluid, including at a central location thereon.

Figure 7:
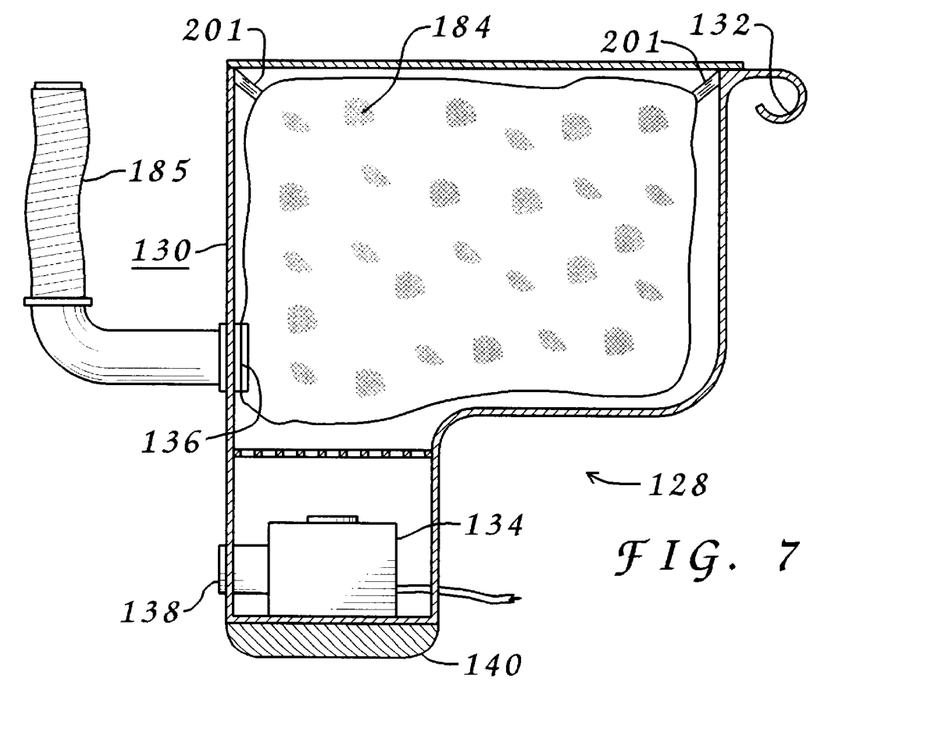
FIG. 7 is a sectional view of another embodiment of a skimmer assembly.
Figure 8:
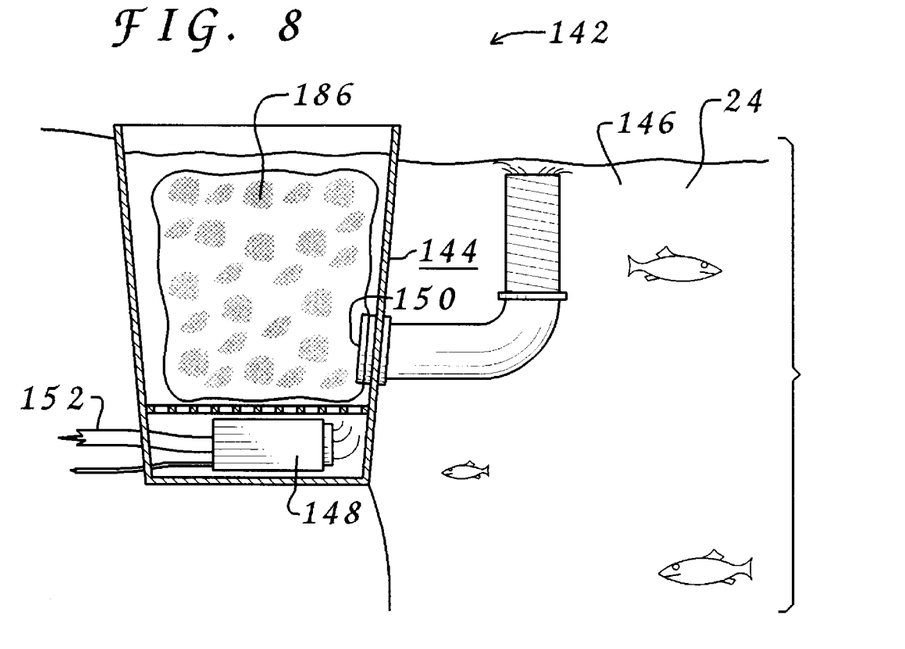
FIG. 8 is a sectional view of still another embodiment of a skimmer assembly.

FIG. 3 depicts pump housing 42 positioned adjacent body of fluid 20 having a pump, not shown, positioned therein. FIG. 7 depicts a skimmer assembly 128 having a housing 130 having a mounting flange 132 positioned thereon. Mounting flange 132 mounts to a standard lip, not shown, of an in ground pond assembly, also not shown. This provides for housing 130 to be fixedly positioned within the fluid of the body of fluid adjacent an edge of the body of fluid. A submersible pump 134 is contained within housing 130 where submersible pump 134 draws fluid from within housing 130 through an inlet 136 and expels that fluid outside of housing 130 through an outlet 138 and directly back into the body of fluid. In FIG. 7 a weight 140 is shown of sufficient weight to retain skimmer assembly 128 relative to the standard lip of the in ground pond assembly. FIG. 8 depicts a skimmer assembly 142 having a housing 144 fixedly positioned outside of a body of fluid 146 and having a submersible pump 148 positioned therein. Submersible pump 148 draws fluid 24 through housing 144 through an inlet 150 and expels that fluid outside of housing 144 through a discharge conduit 152 where such expelled fluid may perform some other useful purpose, such as for waterfalls, fountains etc.

Figure 9:
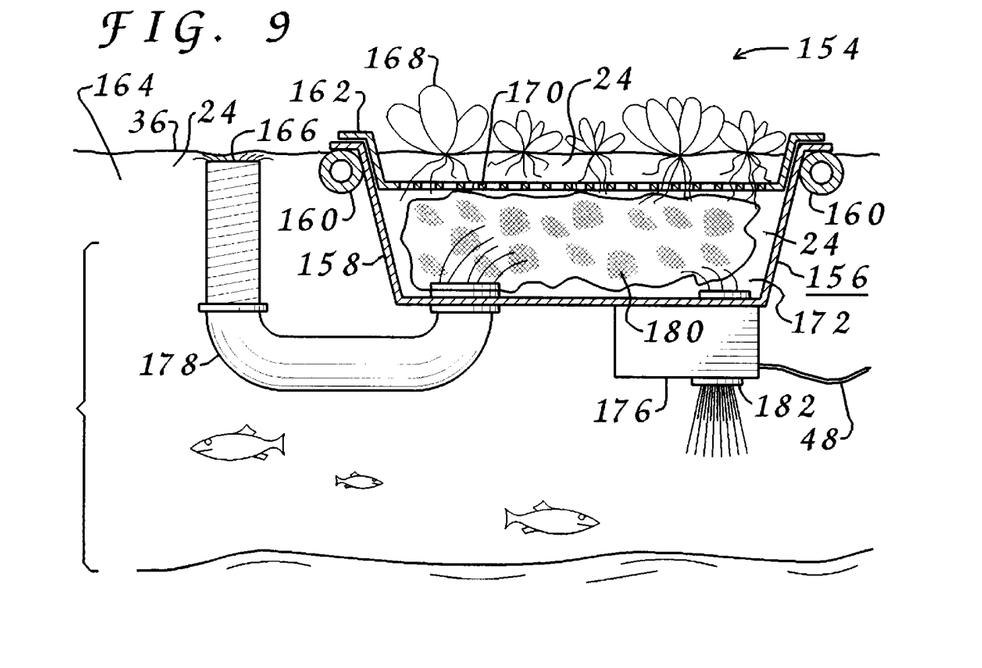
FIG. 9 is a sectional view of yet another embodiment of a skimmer assembly.

FIG. 9 depicts a skimmer assembly 154 having a free floating housing 156. Free floating housing 156 has a basket 158, having floatation members 160 attached thereto, and a tray 162, which rests upon and mates with basket 158. Free floating housing 156 may free float about a body of fluid 164 while an inlet member 166 is positioned adjacent to, and slightly below, surface 36. Tray 162 retains plants 168 therein while access slots 170 allow a commingling of fluid 24 in tray 162 with fluid 24 in basket 158. Tray 162 and basket 158 cooperate to form a chamber 172 therebetween. Attached to basket 158 is a submersible pump 174 which receiving power from power line 48. Submersible pump 174 acts to draw fluid 24 into inlet member 166, convey that fluid 24 through a transfer conduit 178, and expel that fluid 24 into chamber 172. Fluid 24 so entering chamber 172 then passes through a filter bag 180. Submersible pump 174 also acts to draw fluid 24 out of chamber 172 and expel that fluid 24 through an outlet 182 and back into body of fluid 164.

The art is rich with filters capable of filtering a fluid and many of these filters may be employed with the present invention. A first type of filter involves those designed to trap relatively large contaminants from the fluid. Examples of these filters include those having a mesh pattern, either in a rigid shape or of a flexible material, which are designed to remove debris of a significant size as exampled by leaves and twigs. Many mesh pattern filters are bag shaped and flexible to provide for a maximum exposure of trapping surfaces and are loosely contained within a housing. A second type of filter involves those designed to trap extremely small contaminants from the fluid. Typically, these filters will be rigidly contained within a housing. It is known to employ both types in a filtering system and such an arrangement may be employed with the present invention.

When a filter member is deployed within a skimmer assembly based upon the present invention it may be placed in various locations between the inlet opening and the discharge outlet. The filter member may be placed in close proximity to the pump or may be spaced a significant distance therefrom. Additionally, when a mesh pattern bag shaped filter is deployed means may be employed to restrict the filter in a deployed orientation and prevent bunching of the filter.

Figure 10:
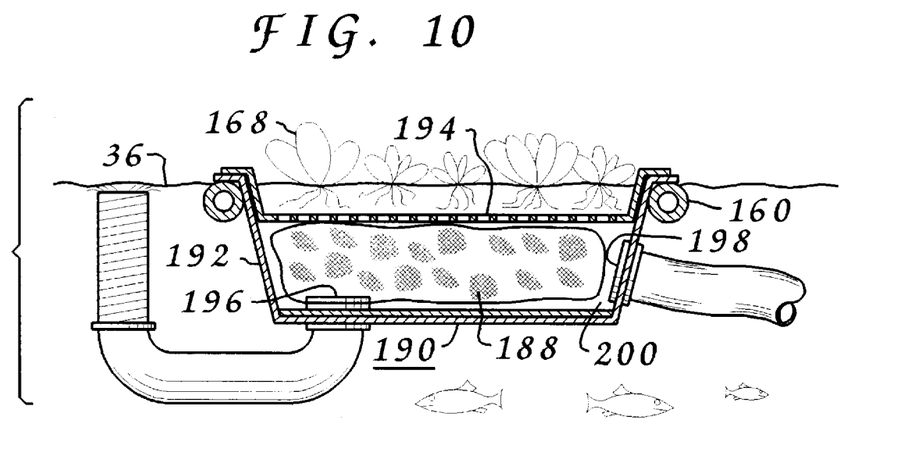
FIG. 10 is a sectional view of an intermediate floating tank.

FIG. 7 depicts housing 130 having positioned therein a bag filter 184. Submersible pump 134 draws fluid through a transfer conduit 185 and through bag filter 184. Any debris, not shown in this view, of a significant size will be trapped within bag filter 184 for subsequent removal from skimmer assembly 128. FIG. 8 depicts housing 144 having positioned therein a bag filter 186 where bag filter 186 is positioned outside of, and adjacent, body of fluid 146 and in close proximity to pump 148. FIG. 9 depicts bag filter 180 contained within free floating housing 156 within body of fluid 164. FIG. 10 depicts a bag filter 188 contained within an intermediate floating tank 190. Intermediate floating tank 190 comprises a housing 192, a tray 194 and floatation members 160. Housing 192 has an inlet coupling 196 and an outlet coupling 198. Floatation members 160 attach to housing 192 to retain intermediate floating tank 190 about surface 36. Tray 194 cooperates with housing 192 to form a chamber 200 therebetween. Bag filter 188 attaches to inlet coupling 196 and is retained within chamber 200. Tray 194 closes and seals chamber 200 containing bag filter 188. Tray 194 may act to retain plants 168 to enhance aesthetic appeal of intermediate floating tank 190. FIG. 7 depicts straps 201 which attach to both housing 130 and bag filter 184 to retain bag filter 184 in a fully deployed orientation within housing 130.

Inevitably some debris which enters the body of fluid will settle to reside on a bottom of the body of fluid. It is desirable to make the skimmer assembly as versatile as possible by providing for the option of allowing for a bottom suction of the body of fluid. This may be provided for in any of several ways. A first example provides for attachment of a secondary transfer conduit to the inlet member with a guidance handle, utilizing any conventionally known connection means, attached to a suction end of the secondary transfer conduit to allow manipulation of the suction end of the secondary transfer conduit about the bottom of the body of fluid. This arrangement provides utilization of the suction action through the inlet member of the skimmer assembly. Alternatively, it is possible to provide for a separate assembly having a transfer conduit, an inlet member and a guidance handle along with coupling means somewhere else within the skimmer assembly. This coupling may occur at any select location within the suction stream. Ideally, when such coupling occurs elsewhere within the suction stream means will exist to divert full suction from the existing inlet member to the bottom suction transfer conduit.

Figure 11:
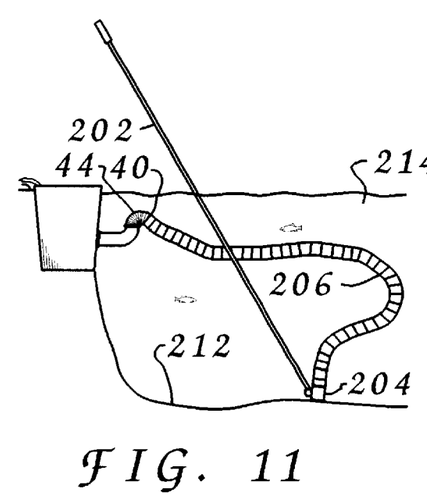
FIG. 11 is an elevational view of a skimmer assembly and a guidance handle in a bottom drawing orientation.
Figure 12:
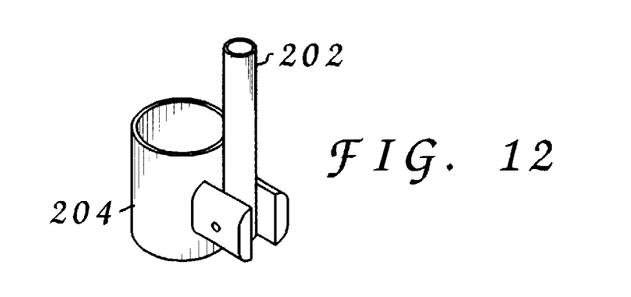
FIG. 12 is an enlarged perspective view of a connection member between an inlet member and the guidance handle.
Figure 13:
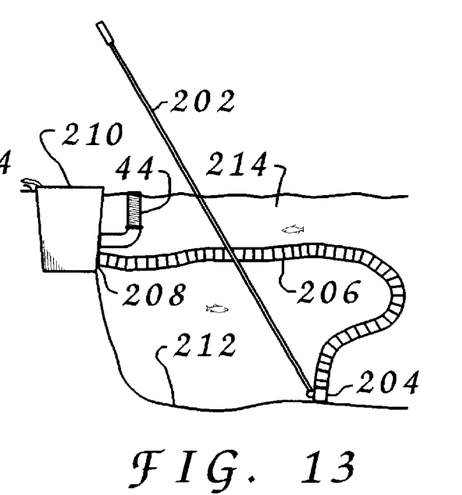
FIG. 13 is an elevational view of another skimmer assembly and a bottom suction assembly in a bottom drawing orientation.

FIG. 11, FIG. 12 and FIG. 13 depict a guidance handle 202 and an inlet member 204 pivotally attached to guidance handle 202 and forming a bottom suction assembly 206. Bottom suction assembly 206 is attached to inlet member 40 in FIG. 11 wherein suction occurs through transfer conduit 44. Bottom suction assembly 206 is attached to a secondary transfer conduit mount 208 of a housing 210 wherein suction occurs through secondary transfer conduit mount 208. In these deployments bottom suction assembly 206 may be employed to clean a bottom 212 of a body of fluid 214. Such attachment of bottom suction assembly 206 to secondary transfer conduit mount 208 diverting suction from transfer conduit 44. Such diversion of suction utilizing any of the conventionally known switching means for transference of suction.

As disclosed elsewhere herein foam fractionation may be employed to trap solids dissolved in the fluid. Skimmer assemblies having features of the present invention are particularly suitable for foam fractionation usage due to a churning of the fluid inherent to entry into these skimmer assemblies. When fluid enters through the inlet member and cascade into the transfer conduit much air is introduced into the suction stream. As previously disclosed structures can be incorporated on, or about, the inlet member to enhance churning and incorporation of additional air into the fluid being conveyed. When foam fractionation is utilized the air bubbles, with any trapped solids attached thereto or therein, may be removed at any desired point within the conveyance stream. In the field of foam fractionation numerous methods are known in the art to remove the air bubbles from the fluid prior to expulsion of the fluid back into the body of fluid being treated and many of these methods may be employed with the present invention.

Figure 14:
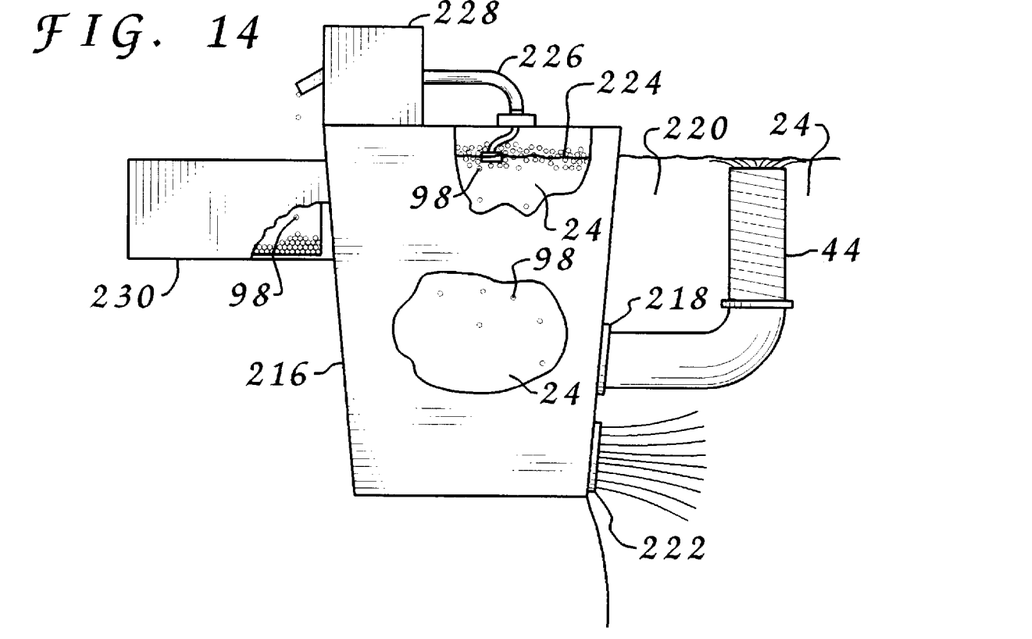
FIG. 14 is an elevational view of a collection housing.
Figure 15:
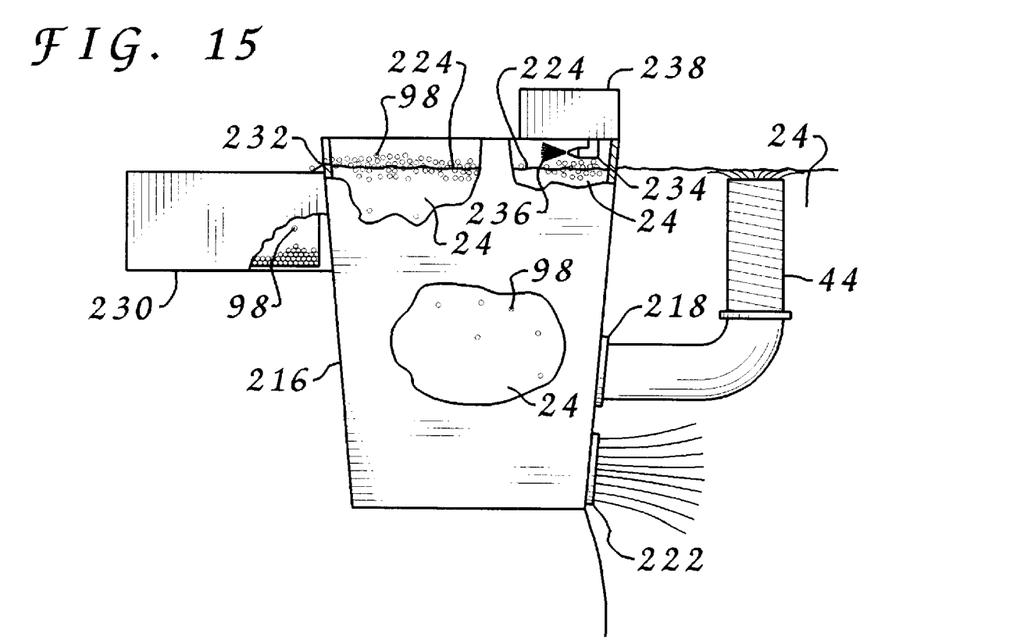
FIG. 15 is an elevational view of another collection housing.

FIG. 14 and FIG. 15 depict a collection housing 216 having an inlet 218, into which fluid 24 having air bubbles 98 contained therein may flow through transfer conduit 44 from a body of fluid 220, and an outlet 222 through which fluid 24 may pass back into body of fluid 220. While within collection housing 216 at least a portion of air bubbles 98 contained in fluid 24 may move upwards toward a surface 224 to gather thereat. In FIG. 14 a surface suction hose 226 is in communication with surface 224. A suction pump 228 provides for a controlled slow withdrawal of fluid 24, and air bubbles 98 therewith, through surface suction hose 226 for discharge into a collection pan 230. In FIG. 15 collection housing 216 has an overflow lip 232 positioned at, or slightly above, surface 224. Any air bubbles 98 overflowing overflow lip 232 pass into collection pan 230. As an enhancement to bias air bubbles 98 to leave surface 224 over overflow lip 232 an air nozzle 234 may direct an air flow 236 from an air pump 238 to surface 224 toward overflow lip 232. In any embodiment collection pan 230 may be removed and any fluid having a concentration of solids removed from fluid 24 may be gathered for subsequent usage or discarded.

Figures 16, 17, 18:
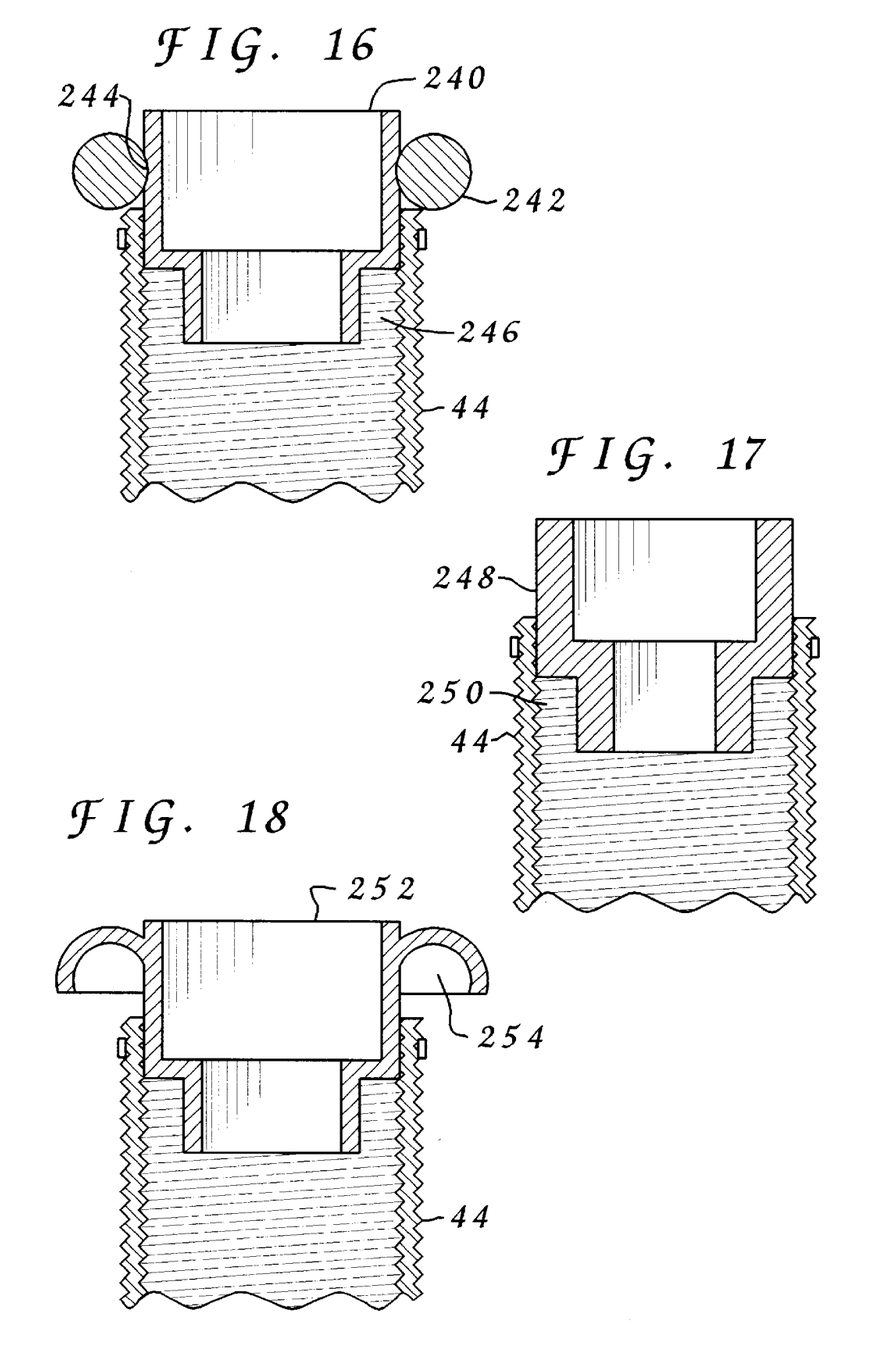
FIG. 16 is a sectional view of another embodiment of a skimmer assembly.
FIG. 17 is a sectional view of another embodiment of a skimmer assembly.
FIG. 18 is a sectional view of another embodiment of a skimmer assembly.

FIG. 16 depicts an inlet member 240 having temporarily attached thereto an attachable float 242. Inlet member 240 has attached thereto transfer conduit 44. Inlet member 240 has a radially disposed trough 244 which accepts positioning therein of attachable float 242. Attachable float 242 has properties, either of material or of construction, which provide for the desired continual buoyancy. An air cavity 246 is formed inside of transfer conduit 44 and beneath inlet member 240 to provide for secondary buoyancy. When it is desired to utilize inlet member 240 and transfer conduit 44 for another desired type of suction operation attachable float 242 may be removed from inlet member 240.

FIG. 17 depicts an inlet member 248 formed of a material having buoyant properties and having a generally uniform wall thickness. Inlet member 248 is depicted attached to transfer conduit 44 and forming an air cavity 250 therebetween to provide for secondary buoyancy.

FIG. 18 depicts an inlet member 252 having an air cavity 254 positioned thereabout. In this embodiment air cavity 254 is externally positioned on inlet member 252 and has an open based design which provides for the desired continual buoyancy of the floatation means when placed within the body of fluid wherein air is trapped within air cavity 254.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A skimmer assembly for attachment to a fluid suction device, the fluid suction device to provide for a drawing of a fluid from a surface of a body of the fluid through the skimmer assembly during a skimming procedure, the skimmer assembly comprising:

a) a transfer conduit having an inlet member attachment end and a fluid suction device attachment end, the fluid suction device attachment end attached to the fluid suction device and wherein the transfer conduit provides for a containment of the fluid during the drawing of the fluid from the surface of the body of the fluid at least immediately prior to reaching the fluid suction device;

b) an inlet member having a wall member radially disposed about a passageway therethrough with an inlet opening positioned at one end of the passageway and an outlet opening positioned at the opposing end of the passageway and wherein the inlet opening provides for a passage thereinto of the fluid during the skimming procedure and wherein the inlet member attachment end of the transfer conduit is attached to the inlet member wherein at least a portion of the transfer conduit is radially disposed about the outlet opening of the inlet member;

c) floatation means to provide for a continual buoyancy, the continual buoyancy of the floatation means to provide for the inlet member to float within the body of the fluid during occasions while the skimming procedure is not occurring;

d) free floating means to provide for the inlet opening of the inlet member to float beneath the surface of the body of the fluid while drifting about the body of the fluid during occasions while the skimming procedure is occurring.

2. The skimmer assembly defined in claim 1 wherein the free floating means further comprises in a cooperation between the continual buoyancy of the floatation member and the drawing of fluid from the surface of the body of the fluid during the skimming procedure.

3. The skimmer assembly defined in claim 1 wherein the free floating means further comprises an air cavity positioned about the inlet member wherein air resides within the air cavity to provide for a secondary buoyancy during the skimming procedure.

4. The skimmer assembly defined in claim 3 wherein the inlet member further comprises an exterior, the exterior of the inlet member comprising:
   a) an upper portion positioned distal from the outlet opening and having a predominate dimensional measurement;
   b) a lower portion positioned distal from the inlet opening and having a predominate dimensional measurement, the predominate dimensional measurement of the upper portion being greater than the predominate dimensional measurement of the lower portion;
   c) a transition portion positioned between the upper portion and the lower portion, the transition portion for transition from the predominate dimensional measurement of the upper portion to the predominate dimensional measurement of the lower portion and wherein the inlet member attachment end of the transfer conduit radially contacts the upper portion of the exterior of the inlet member;
   wherein the air cavity is positioned between the lower portion of the inlet member and the transition portion of the inlet member and the transfer conduit.

5. The skimmer assembly defined in claim 1 wherein the free floating means further comprises offset means, the offset means to provide for forming an air cavity radially disposed between the inlet member and the transfer conduit, the air cavity defined inward by an exterior of the wall member of the inlet member adjacent the outlet opening and outward by an inside surface of the inlet member attachment end of the transfer conduit, the air cavity positioned above the outlet opening of the inlet member and radially spaced outward therefrom.

6. The skimmer assembly defined in claim 1 wherein the floatation member has a radial shape and radially surrounds the inlet member.

7. The skimmer assembly defined in claim 1 wherein the floatation member is radially attached to the inlet member.

8. The skimmer assembly defined in claim 1 wherein the floatation member is radially attached to the transfer conduit.

9. A skimmer assembly for skimming of a fluid from a surface of a body of the fluid during a skimming procedure, the skimmer assembly comprising:
   a) an inlet member comprising:
      1) a wall member radially disposed;
      2) an interior defined by the wall member;
      3) an exterior;
      4) an upper terminal edge defining an inlet opening and extending from the interior to the exterior;
      5) a lower terminal edge defining an outlet opening within the interior, the outlet opening in communication with the inlet opening utilizing a passageway through the interior for a passage therethrough of the fluid entering the inlet opening;
   b) a transfer conduit attached to the inlet member wherein the transfer conduit seals the outlet opening for passage into the transfer conduit of the fluid entering the inlet opening, the transfer conduit to provide for a containment of the fluid entering the inlet opening of the inlet member;
   c) a discharge outlet for an expulsion of the fluid from the skimmer assembly;
   d) floatation means to provide for a drifting floatation of the inlet member and a portion of the transfer conduit within the body of the fluid during the skimming procedure, the upper terminal edge of the inlet member beneath the surface of the body of the fluid during the floatation during the skimming procedure;
   e) fluid transfer means to provide for:
      1) a drawing of the fluid through the inlet opening of the inlet member during the skimming procedure;
      2) a conveyance of the fluid through the transfer conduit during the skimming procedure;
      3) an expulsion of the fluid through the discharge outlet during the skimming procedure.

10. The skimmer assembly defined in claim 9 wherein the floatation means further comprises a floatation member, the floatation member of a construction from a solid buoyant material.

11. The skimmer assembly defined in claim 9 wherein the floatation means further comprises a floatation member, the floatation member of a construction from a sheet material and wherein the sheet material forms a sealed buoyancy chamber.

12. The skimmer assembly defined in claim 9 wherein the floatation means further comprises a construction of the inlet member from a buoyant material.

13. The skimmer assembly defined in claim 9 wherein the floatation means further comprises a floatation member and wherein the floatation member has an upper terminal edge and wherein the floatation member is radially secured to the inlet member to surround the inlet member with the upper terminal edge of the floatation member generally level with the upper terminal edge of the inlet member.

14. The skimmer assembly defined in claim 9 wherein the floatation means further comprises an air cavity to provide for the drifting floatation during the skimming procedure, the air cavity open to an interior of the transfer conduit and radially spaced outward from and elevationally above the lower terminal edge of the inlet member, wherein the inlet opening of the inlet member resides beneath the surface of the body of the fluid while air remains trapped within the air cavity during the skimming procedure.

15. The skimmer assembly defined in claim 9 wherein the floatation means further comprises an air cavity to provide for the drifting floatation during the skimming procedure, the air cavity positioned about the exterior of the inlet member and having an open base radially disposed about the exterior of the inlet member.

16. A skimmer assembly for attachment to a fluid suction device, the fluid suction device to provide for a drawing of a fluid from a surface of a body of the fluid through the skimmer assembly during a skimming procedure, the skimmer assembly comprising:
   a) a transfer conduit having an inlet member attachment end and a fluid suction device attachment end, the fluid suction device attachment end attached to the fluid suction device and wherein the transfer conduit provides for a containment of the fluid during the drawing of the fluid from the surface of the body of the fluid prior to reaching the fluid suction device;
   b) an inlet member having a wall member radially disposed about a passageway therethrough with an inlet opening positioned at one end of the passageway and an outlet opening positioned at the opposing end of the passageway and wherein the inlet opening provides for a passage thereinto of the fluid during the skimming procedure and wherein the inlet member attachment end of the transfer conduit is attached to the inlet member wherein at least a portion of the transfer conduit is radially disposed about the outlet opening of the inlet member;

c) a floatation member having a continual buoyancy, the continual buoyancy of the floatation member to provide for the inlet member to float within the body of the fluid during occasions while the skimming procedure is not occurring, the floatation member the floatation member secured to the skimmer assembly relative to the inlet opening of the inlet member;

d) free floating means to provide for the inlet member to float beneath the surface of the body of the fluid while drifting about the body of the fluid during occasions while the skimming procedure is occurring;

e) mixing means to provide for a mixing of air with the fluid during the conveyance of the fluid through the transfer conduit during the skimming procedure wherein solids within the fluid are trapped in air bubbles;

f) air bubble removal means to provide for a removal of at least a portion of the air bubbles with the trapped solids from the fluid prior to the expulsion of the fluid through the discharge outlet during the skimming procedure.

17. The skimmer assembly defined in claim 16 wherein the air bubble removal means further comprises:

a) a collection housing wherein the fluid gathers to a predetermined level, the fluid in the collection housing having a surface at the predetermined level;

b) surface suction means to provide for a suction skimming of the surface of the fluid in the collection housing to remove at least the portion of the air bubbles during the skimming procedure.

18. The skimmer assembly defined in claim 16 wherein the air bubble removal means further comprises a collection housing having:

a) an overflow lip;

b) a fluid discharge outlet elevationally positioned below the overflow lip, the fluid discharge outlet to provide for a removal of a majority of the fluid from the collection housing wherein the fluid gathers to a predetermined level in extremely close proximity to the overflow lip of the collection housing and wherein at least the portion of the air bubbles escape over the overflow lip of the collection housing during the skimming procedure.

19. The skimmer assembly defined in claim 18 further comprising air flow means to provide for directing an air flow adjacent and above a surface of the fluid gathered at the predetermined level within the collection housing to force the portion of the air bubbles over the overflow lip of the collection housing during the skimming procedure.

20. The skimmer assembly defined in claim 16 wherein the air bubble removal means further comprising suction means to provide for creating a suction adjacent a surface of the fluid subsequent to the drawing of the fluid through the inlet opening of the inlet member during the skimming procedure.

* * * * *